July 31, 1956 O. W. WARE 2,756,536
FISHHOOKS
Filed March 20, 1953
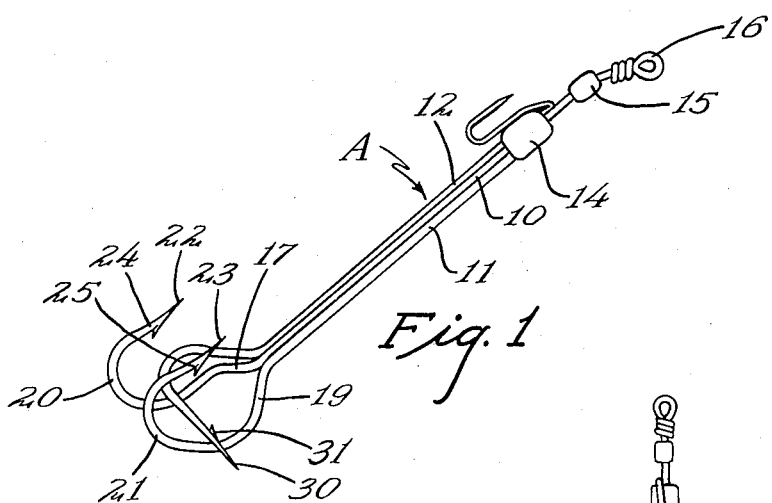
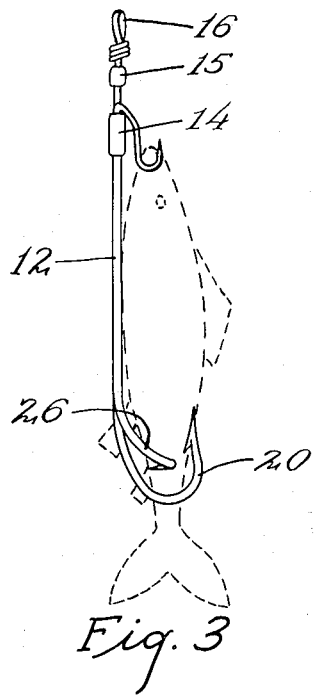
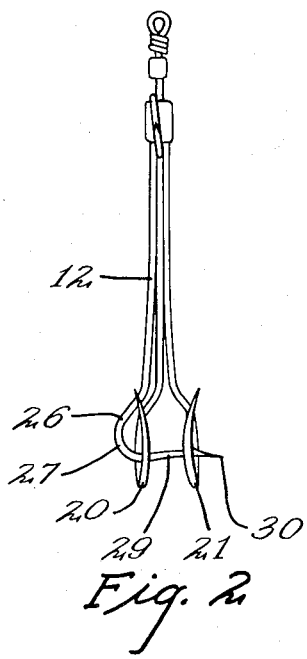
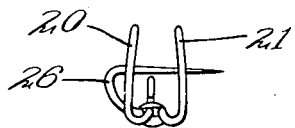
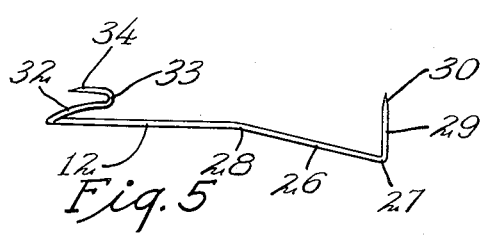
INVENTOR
Orby Ware
BY Robert M. Dunning
ATTORNEY United States Patent Office 2,756,536
Patented July 31, 1956

2,756,536

FISHHOOKS

Orby Walter Ware, Lake George, Minn.

Application March 20, 1953, Serial No. 343,697

2 Claims. (Cl. 43—44.8)

This invention relates to an improvement in fish hooks and deals particularly with a fish hook structure designed for use with live minnows and the like.

Live minnows are often used as bait in catching fish. One of the difficulties experienced with using such minnows lies in the fact that they do not live long after they are impaled on a fish hook in the usual manner. The purpose of the present structure is to provide a hook arrangement which may be used with live minnows and which will permit them to stay alive a considerable period after they have been placed on the hook.

An object of the present invention resides in the provision of a hook structure which will permit the hook to extend through the fleshy portion of the back of the minnow. This portion of the minnow may be impaled by the hook without injuring the minnow to the extent that they die quickly. It is important in certain types of fishing that the minnow remain alive so that it may swim about in the water to attract the fish. With the present arrangement, this is possible. At the same time, the hook structure is such that it may be readily removed from the fish after the fish has taken the bait.

A feature of the present invention resides in the provision of a hook structure including a pair of fish hooks having hook shaped pointed ends which are arranged in parallel spaced relation to accommodate a minnow or similar bait therebetween. A third hook is arranged with its hook end on a plane substantially at right angles to the planes of the first mentioned hooks. This third hook normally extends across the planes of the parallel hooks so as to intersect the space therebetween. However, the shank of the hook permits this third hook to be sprung away from the first mentioned hooks so as to permit the insertion or withdrawal of the third hook.

A feature of the present invention resides in the provision of a fish hook including a pair of parallel hooks between which the minnow may extend and including a third hook designed to extend transversely through the back portion of the minnow so as to impale the fleshy portion of the back of the minnow. As a result the minnow remains alive for a considerable period of time and is free to swim about when suspended in the water from the fishing line.

These and other objects and novel features of my invention will be more clearly and fully set forth in the following specification and claims.

In the drawings forming a part of my specification:

Figure 1 is a perspective view of the fish hook showing the general construction thereof.

Figure 2 is a front elevational view of the fish hook shown in Figure 1.

Figure 3 is a side elevational view of the fish hook showing the location of the transverse hook with respect to the parallel hooks.

Figure 4 is an end view of the hook structure.

Figure 5 is a perspective view of a portion of my hook structure.

The hook A is constructed as best illustrated in Figure 1 of the drawings. The hook includes a pair of parallel hook shanks 10 and 11 and a third hook shank 12 which extends substantially parallel to the hook shanks 10 and 11. The shanks are secured together in any suitable manner, the ends of the shanks being preferably anchored together as illustrated and preferably provided with a fastening means 14 which serves both as a weight for the hook and also as a means of securing the shank ends together. The anchored end may or may not be provided with a swivel 15 which terminates in an eye 16 designed for attachment with a fishing line or with a leader.

The hook shanks 10 and 11 are provided at points spaced from their connected ends with outwardly diverging portions 17 and 19 respectively. Rounded hook ends 20 and 21 are connected to the diverging portions 17 and 19 these hook ends being arranged in substantially parallel planes as indicated in Figures 2 and 4 of the drawings. The hooks are provided with pointed extremities 22 and 23 which are preferably provided with barbs 24 and 25 as is customary in hooks of this general type.

The hook ends 20 and 21 are spaced apart a distance sufficient to accommodate the body of a minnow or similar bait therebetween. One of the hook ends 20 is designed to extend on one side of the body of the minnow while the other hook end 21 extends on the opposite side thereof. Means is provided for holding the minnow in this location, this means comprising a hooking portion at the free end portion of the hook shank 12.

As best shown in Figure 5 of the drawings, the hook shank 12 is bent at 28 to provide a laterally off-set portion 26 which is bent at 27 to provide a laterally extending hook end 29. This hook end terminates in a hook point 30 and the hook point is preferably barbless but may be equipped with a barb. The hook end 29 extends substantially normal to the planes of the hook ends 20 and 21 and is designed to extend transversely through the body of a minnow, preferably impaling the fleshy portion of the back of the minnow.

In normal condition the hook appears as indicated in the various views of the drawing. When it is desired to bait a hook, the hook shank 12 is flexed so as to withdraw the hook end 29 from the space between the rounded hook portions 20 and 21. When the minnow has been inserted between these parallel hooks, the shank 12 is released and the hook end 29 impales the minnow and secures it firmly in place. At the end of the shank 12 opposite to the pointed end described, I provide a reversely bent portion 32 which extends back over the fastening means 14 holding the various shanks together. This reversely bent portion 32 is provided with a rounded bend 33 terminating in a pointed hook end 34 which is directed in the same general direction as the barbed hook ends 22 and 23. This hook end 34 is preferably barbless.

When the hook is baited there are several alternative hooks used in still fishing, the minnow is at substantially right angles to the hook shanks, one hook 21 or 22 extending on each side of the minnow and the hook shanks extending substantially vertically when the minnow is horizontal. However, when the hook is used for trolling, for example, the small hook 34 is inserted vertically through the jaws of the minnow and the body of the minnow is then swung parallel to the shanks 10, 11 and 12.

The shank 12 is flexed so that the hook point 30 is withdrawn from between the hooks 20 and 21, and the body of the minnow is swung between these hooks. The shank 12 is then released, and the pointed end of the hook 31 impales the body of the minnow. When thus impaled, the minnow is held between the hooks 20 and 21, and extending longitudinally of the shanks of the hooks.

While it has long been recognized that a hook may be extended transversely through the back of a minnow without seriously endangering the life of the minnow, it has usually not been possible to retain the minnow on the hook for any great period of time in this position as movement of the minnow tends to loosen the hook and to produce a big enough opening through the back of the minnow to permit the minnow to escape from the hook. With the present arrangement the parallel hooks hold the center portion of the minnow at right angles to the hook end 29 and any twisting movement of the minnow does not change the relationship between this hook end and the back of the minnow.

Accordingly the movement of the minnow does not tend to permit the minnow to escape from the hook. It should further be noted that the spring of the hook shank 12 tends to hold the transversely extending hook in proper position extending through the back of the minnow. However, when it is desired to remove the hook, it is only necessary to flex the shank 12 so as to withdraw the hook point from the minnow.

In accordance with the patent statutes, I have described the principles of construction and operation of my fish hook, and while I have endeavored to set forth the best embodiment thereof, I desire to have it understood that obvious changes may be made within the scope of the following claims without departing from the spirit of my invention.

I claim:

1. A fish hook structure including three hooks having substantially parallel shank portions secured together adjacent one end thereof and lying in substantially the same plane, two of said shanks having oppositely diverging portions adjacent the free end portions thereof and said free end portions having formed thereon substantially rounded hook portions lying in substantially parallel planes, and the third shank having a bait hooking free end portion offset from the plane of the shanks and extending substantially normal to the planes of said hook portions and being directed to normally intersect the planes of said hook portions, said third shank being formed of resilient material so that the bait hooking portion thereof may be withdrawn from said intersecting position.

2. A fish hook structure including a pair of substantially parallel hook shanks lying substantially in the same plane and having outwardly diverging portions adjacent one of the ends thereof, said ends forming rounded hooks arranged in substantially parallel planes, a third hook shank extending generally along the major portion of its length substantially parallel to said pair of shanks and having at one end thereof a laterally offset hook extending at substantially right angles to the planes of the first mentioned hooks and being directed to normally intersect the planes thereof, and means for connecting together the other ends of said shanks.

References Cited in the file of this patent

UNITED STATES PATENTS

| Number | Name | Date |
|---|---|---|
| 863,272 | Gebhardt | Aug. 13, 1907 |
| 1,312,734 | Jones | Aug. 12, 1919 |
| 1,613,113 | Leu | Jan. 4, 1927 |
| 2,051,651 | Pachner et al. | Aug. 18, 1936 |
| 2,193,103 | Kowalski | Mar. 12, 1940 |